United States Patent

Alverson

[11] Patent Number: 5,844,202
[45] Date of Patent: Dec. 1, 1998

[54] PORTABLE AUTOMATIC WINDSHIELD DEFROSTER

[76] Inventor: Jamie Alverson, 36 Fouche Dr., Cartersville, Ga. 30120

[21] Appl. No.: 866,805

[22] Filed: May 30, 1997

[51] Int. Cl.$^6$ ...................................................... B60L 1/02
[52] U.S. Cl. ........................... 219/203; 219/202; 219/520; 219/522; 392/367
[58] Field of Search ..................................... 219/201, 202, 219/203, 520, 521, 522, 523; 34/97; 237/12.3 R, 12.3 A; 392/367; 454/127

[56] References Cited

U.S. PATENT DOCUMENTS

| | | | |
|---|---|---|---|
| 4,293,759 | 10/1981 | Higgins | 219/202 |
| 4,555,743 | 11/1985 | Kokubu et al. | 361/196 |
| 4,588,351 | 5/1986 | Miller | 415/47 |
| 4,730,662 | 3/1988 | Kobayashi | 165/25 |
| 5,025,130 | 6/1991 | Slone | 219/203 |
| 5,386,098 | 1/1995 | Knudsen | 219/203 |
| 5,414,257 | 5/1995 | Stanton | 250/227.25 |

*Primary Examiner*—Tu B. Hoang

[57] ABSTRACT

A portable automatic windshield defroster having a housing, including a housing top and a housing bottom. The housing further includes a housing left and a housing right. The housing left is securely attached to a proximal end of the housing left egress and is sealably connected to a housing left connector which functions to cover the housing left egress. A housing left diffuser is sealably connected to a distal end of the housing left connector. The housing bottom has a housing bottom inlet therethrough. The housing bottom further comprises a housing bottom attachment means secured thereto and functions to removably affix the housing bottom to a vehicle dashboard. The portable automatic windshield defroster further comprises a primary power means, which may include a cigarette lighter cord.

2 Claims, 3 Drawing Sheets

1

PORTABLE AUTOMATIC WINDSHIELD DEFROSTER

FIELD OF THE INVENTION

The present invention relates to window defrosters. More particularly, the present invention relates to a portable window defroster having a built-in timer.

BACKGROUND OF THE INVENTION

1. Description of the Prior Art:

Frost and ice which collects on vehicle windshields must be removed in order that the vehicle can be driven safely. Various devices are used to heat a vehicle windshield or direct heated fluids onto the windshield surface. The devices are built into the vehicle and controlled by the operator. The devices may automatically shut off after a preselected period of time or are manually controlled. The removal of frost and ice does not begin until the operator turns on the defroster device which typically requires the operator to be in the vehicle.

Numerous innovations for portable automatic windshield defroster have been provided in the prior art that are described as follows. Even though these innovations may be suitable for the specific individual purposes to which they address, they differ from the present invention as hereinafter contrasted.

In U.S. Pat. No. 5,386,098, titled Arrangement for Electrically Heating Parking Areas for Windshield Wipers, invented by William Knudsen, an arrangement for heating upper and lower windshield wiper blades parked proximate the lower edge of a windshield utilizes an electric heating grid placed against the inside surface of the windshield, substantially in alignment with the parked wiper blades. The electric heating grid comprises a first wire in alignment with the lower blade, an intermediate wire and an upper wire in alignment with the upper blade. The wires have an opposite end which are connected to busses that are disposed at the lower edge of the windshield, the busses having leads for connection to power circuitry. The power circuitry includes a climate control system having a switch which is rotatable to a defrost position so that the climate control system defrosts the windshield, while current flows through the grid. As long as the switch is in the defrost position, the current continues to flow. The power circuitry also includes a windshield wiper deicing switch which operates independently of the defrost switch. Associated with the windshield wiper deicing switch is a timer which opens the closed deicing switch after a selected interval of time. This arrangement provides an inexpensive reliable system for deicing windshield wiper blades because the wires are disposed on the windshield against the inside surface of the windshield.

In U.S. Pat. No. 4,293,759, titled Moisture Sensor for Detecting Moisture on a Windshield, invented by Peter R. Stanton, a moisture sensor device for a vehicle windshield consists of a housing having a front portion composed of transparent material forming a window with an inner surface formed in a stepwise shape with two planar surfaces oblique to the outer front surface and an outer surface of which is optically adapted to be coupled to an inner surface of the windshield. An internal body portion fits within the housing and has a stepwise shaped outer surface fitting to the inside surface of the window, and includes a radiant energy emitter and a radiant energy detector positioned at oblique surfaces complementary to those of the window. Radiant energy passes from the emitter to the detector through the window and windscreen optically coupled thereto in an optical path that includes internal reflections at an outer surface of the windshield and at a planer side surface of the window. A circuit board alongside the internal body includes circuitry for operating the sensor device.

In U.S. Pat. No. 4,293,759, titled Electric Heating System for Heating the Interior of a Motor Vehicle Prior to Starting, invented by Pink M. Higgins, an electric heating system for heating the passenger compartment and defrosting the windshield and rear window prior to starting includes an electric air heater unit fixedly mounted in the vehicle trunk under the conventional horizontal shelf behind the rearmost seat of the vehicle. Air drawn from the trunk by a blower is heated by an electric heater and conveyed upwardly into the interior of the vehicle over the rear window and forwardly toward the windshield. The heater and blower are energized from a house power receptacle by a power cord retractable into a storage reel in the trunk beneath the shelf when not in use. The heater and blower are automatically energized at a preselected time by a manually settable timer located within the trunk. The timer motor is continuously energized from the vehicle battery whereby timer operation is independent of whether the power cord is connected to the house power receptacle In U.S. Pat. No. 4,555,743, titled Timer Circuit, invented by Sadao Kokubu, Massatoshi Hirano, and Takao Sakakibara, a timer circuit suitable for operating, for a required period of time, the windshield defrosting heater in an automobile, comprises a switch operative only in one direction, such as a momentary unidirectional switch, a timer which starts timing operation after a lapse of a predetermined time, and a flip-flop circuit or the like. The switch allows setting and canceling for timing operation, whereby the operative characteristics are improved and the mechanical design is simplified. Moreover, the use of a flip-flop circuit reduces the occupance of chattering.

In U.S. Pat. No. 5,025,130 titled Vehicle heating Device, invented by Michael D. Slone, a vehicle heating device includes a housing containing a rechargeable battery in a recharging unit which is selectively connectable to an AC or a DC power supply source for maintaining the battery in a charged condition. The housing is in the form of a case having a hinged lid and an interior providing with a plurality of storage receptacles for storing and transporting a blower assembly and a pair of vent conduits. The blower assembly includes an electric fan for discharging air through two heated air outlets apertures. Preferably, electrical resistance heating elements are utilized to heat air within the blower assembly. The vent conduits comprise elongated flexible corrugated tubes each provided with a plurality of spaced vent apertures. In use, the blower assembly and vet conduits are supported in spaced relation above a vehicle dashboard by a plurality of support stands. A power cord connects the blower assembly to the rechargeable battery, and a timer in the housing may be set to activate the blower fan and heating elements at a predetermined time to heat the interior of a vehicle and to defrost the vehicle windshield.

In U.S. Pat. No. 4,588,351, titled Centrifugal-Type Air Blower Bleed-Off Arrangement, invented by Larry D. Miller, a centrifugal-type air blower for vehicle occupant compartment that operates in a housing and during a defrost mode to deliver heated air to defrost the vehicle windshield is provided with automatic bleed-off valve arrangement that automatically exhausts from the blower housing to outside the vehicle any airborne particles such as snow and water centrifugally discharged by the blower in defrost mode when the outside air temperature falls below a predetermined sub-freezing water temperature.

In U.S. Pat. No. 4,730,662, titled Automotive Automatic Air Conditioning System with Variable Temperature Demist Mode, invented by Shinma Kobayashi, an automotive air conditioning system has a DEMIST mode which is operative at least in VENT or BILEVEL modes for switching air-conditioning air flow from an upper vent air outlet to a defroster nozzle. In the DEMIST mode, the temperature of air discharged through the defroster nozzle is conditioned according to a previously selected, desired temperature so that the air discharged through the defroster nozzle can perform defrosting or DEMISTING of the front windshield as well as conditioning of the temperature in the vehicle cabin. A blower speed control system responds to the selection of the DEMIST mode by temporarily adjusting the variable range of the blower speed to not less than a medium speed for a given time period. This helps speed the defrosting or demisting effect of the air-conditioning system.

The above patented inventions differ from the present invention because they fail to describe or claim at least one combination of the following features depicted in the present invention; portability, timed activation, operates from the vehicle power supply, and operates from a secondary power supply.

Numerous innovations for portable automatic windshield defroster have been provided in the prior art that are adapted to be used. Even though these innovations may be suitable for the specific individual purposes to which they address, they would not be suitable for the purposes of the present invention as heretofore described.

SUMMARY OF THE INVENTION

Clearing a vehicle windshield of frozen or condensed deposits is necessary prior to operating the vehicle. Vehicles located in areas where frozen or condensed deposits are a problem are typically equipped with a defrosting device. The device is activated by an operator in the vehicle. Because of this the operator must activate the device then wait until the frozen or condensed deposits have dissipated. What is needed is a device which can be activated by a timer some time before the operator desires to use the vehicle so that the windshield is cleared when the operator is ready to get underway. Further, it is desirable that a device be portable so that installation to existing vehicles is readily accomplished.

The types of problems encountered in the prior art are frozen or condensed deposits that collect on a vehicle windshield and thereby obscure the operator's view. The operator must enter the vehicle and activate a defrosting device. The operator then must wait until the frozen or condensed deposits have dissipated clearing the operator's view in order to safely operate the vehicle.

In the prior art, unsuccessful attempts to solve this problem were by operator activated built in devices which direct heated fluids against the windshield. However, the problem was solved by the present invention because it is portable so that it can be installed in any vehicle and it is activated by a timer prior to the operator entering the vehicle.

The present invention solved a long felt need for a frozen and condensed deposit removal device which clears the windshield prior to the operator entering the vehicle.

Accordingly, it is an object of the present invention to provide frozen and condensed deposit removal device which is portable and activated by a timer prior to the operator entering the vehicle.

More particularly, it is an object of the present invention to provide a portable defroster that is activated by an operator settable timing device.

In keeping with these objects, and with others which will become apparent hereinafter, one feature of the present invention resides, briefly stated, in a portable automatic windshield defroster which is operator located to direct heated air onto the surface of a vehicle windshield.

In accordance with another feature of the present invention, a timer which is settable by a operator, activates the portable automatic windshield defroster.

Another feature of the present invention is that a primary power means is the vehicle power means.

Yet another feature of the present invention is that a secondary storage power means is located within the present invention and is connected to the heating means and air circulation means by the timer.

Still another feature of the present invention is that the operator selects a temperature setting on a temperature control.

Yet still another feature of the present invention is that the primary power means is electrically connected to the present invention by a primary power means cigarette lighter cord.

Still yet another feature of the present invention is that heating elements heat the incoming air.

Another feature of the present invention is that a motor is connected to a right fan by a right fan shaft.

Another feature of the present invention is that a motor is connected to a left fan by a left fan shaft.

Yet another feature of the present invention is that a motor drives a right fan and a left fan drawing air through a housing bottom inlet Still another feature of the present invention is that air is forced out from a housing left diffuser and a housing right diffuser.

Yet still another feature of the present invention is that the housing left diffuser and the housing right diffuser direct heated air onto the inner surface of the windshield.

Still yet another feature of the present invention is that an ON/OFF switch controls the primary power and secondary power.

Another feature of the present invention is that a temperature control prevents over heating.

Yet another feature of the present invention is that air is drawn in through a housing left egress and a housing right egress then heated by a heating element.

Still another feature of the present invention is that present invention rests on the vehicle dashboard.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

DETAILED DESCRIPTION OF THE PREFERRED EMBODIMENT

Figure 1:
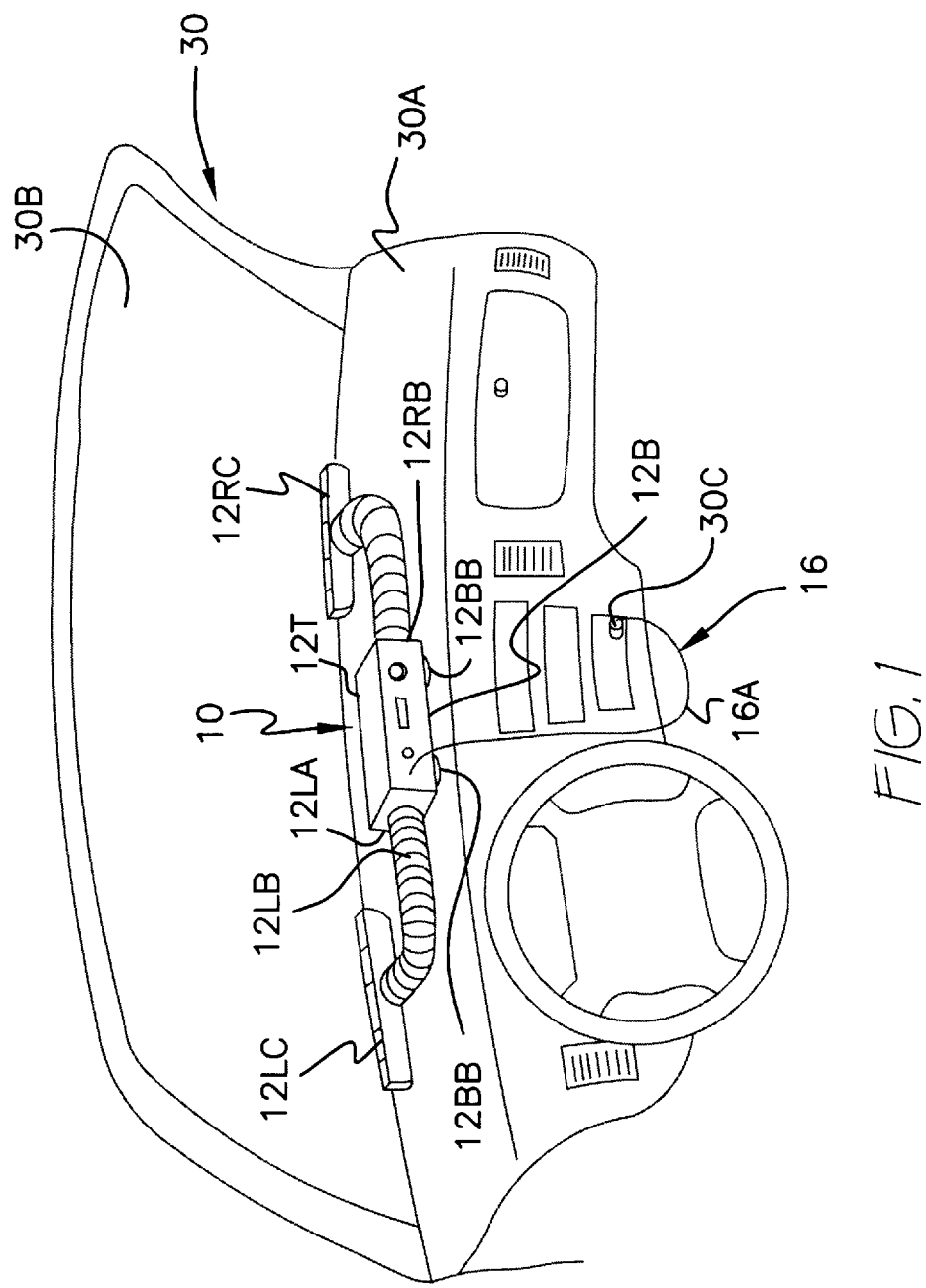
FIG. 1 is a perspective view of a portable automatic windshield defroster in an operable position on a dashboard of a vehicle.

Firstly, referring to FIG. 1 there is shown is a perspective view of a portable automatic windshield defroster (10) mountable within a vehicle (30). The portable automatic windshield defroster (10) comprises a housing (12). The housing (12) comprises a housing top (12T) and a housing bottom (12B).The housing (12) further comprises a housing left (12L) and a housing right (12R). At least one of the housings (12L, 12R) further comprises a housing egress (12LA, 12RA) therethrough.

The housing left (12L) comprises a housing left egress (12LA) positioned within the housing left (12L). A proximal end of the housing left egress (12LA) is sealably connected to a housing left connector (12LB) which functions to cover the housing left egress (12LA). A housing left diffuser (12LC) is sealably connected to a distal end of the housing left connector (12LB).

The portable automatic windshield defroster (10) further comprises a housing right egress (12RA) positioned within the housing right (12R) having a proximal end of a housing right connector (12RB) sealably connected thereto covering the housing right egress (12RA). A housing right diffuser (12RC) is sealably connected to a distal end of the housing right connector (12RB).

The portable automatic windshield defroster (10) further comprises a primary power means (16). The primary power means (16) comprises a primary power means cigarette lighter cord (16A) removably attachable to a vehicle cigarette lighter (30C).

The housing (12) is manufactured from a material selected from a group consisting of metal, metal alloy, plastic, plastic composite, wood, ceramic, fiberglass, epoxy, carbon-graphite, rubber, and rubber composites.

Figure 2:
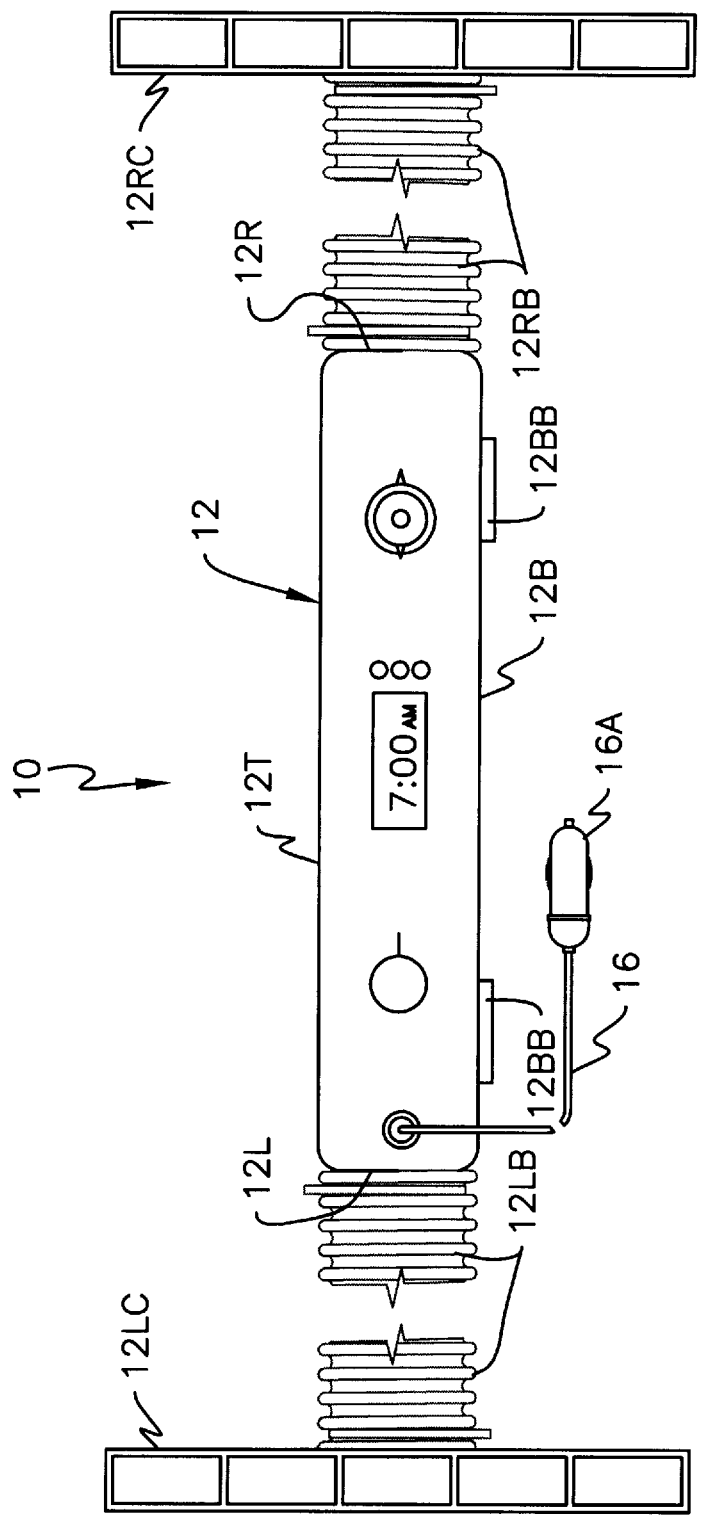
FIG. 2 is a forward looking view of a portable automatic windshield defroster.

Secondly, referring to FIG. 2, there is shown a forward looking view of a portable automatic windshield defroster. The portable automatic windshield defroster (10) comprises a housing (12). The housing (12) comprises a housing top (12T) and a housing bottom (12B).The housing (12) further comprises a housing left (12L) and a housing right (12R).

The housing left (12L) is securely attached to a proximal end of the housing left egress (12LA) is sealably connected to A housing left connector (12LB) which functions to cover the housing left egress (12LA). A housing left diffuser (12LC) is sealably connected to a distal end of the housing left connector (12LB). The housing bottom (12B) has a housing bottom inlet (12BA) therethrough. The housing bottom (12B) comprises a housing bottom attachment means (12BB) attached thereto functioning to removably affix the housing bottom (12B) to a vehicle dashboard (30A).

The portable automatic windshield defroster (10) further comprises a primary power means (16). The primary power means (16) comprises a primary power means cigarette lighter cord (16A).

Figure 3:
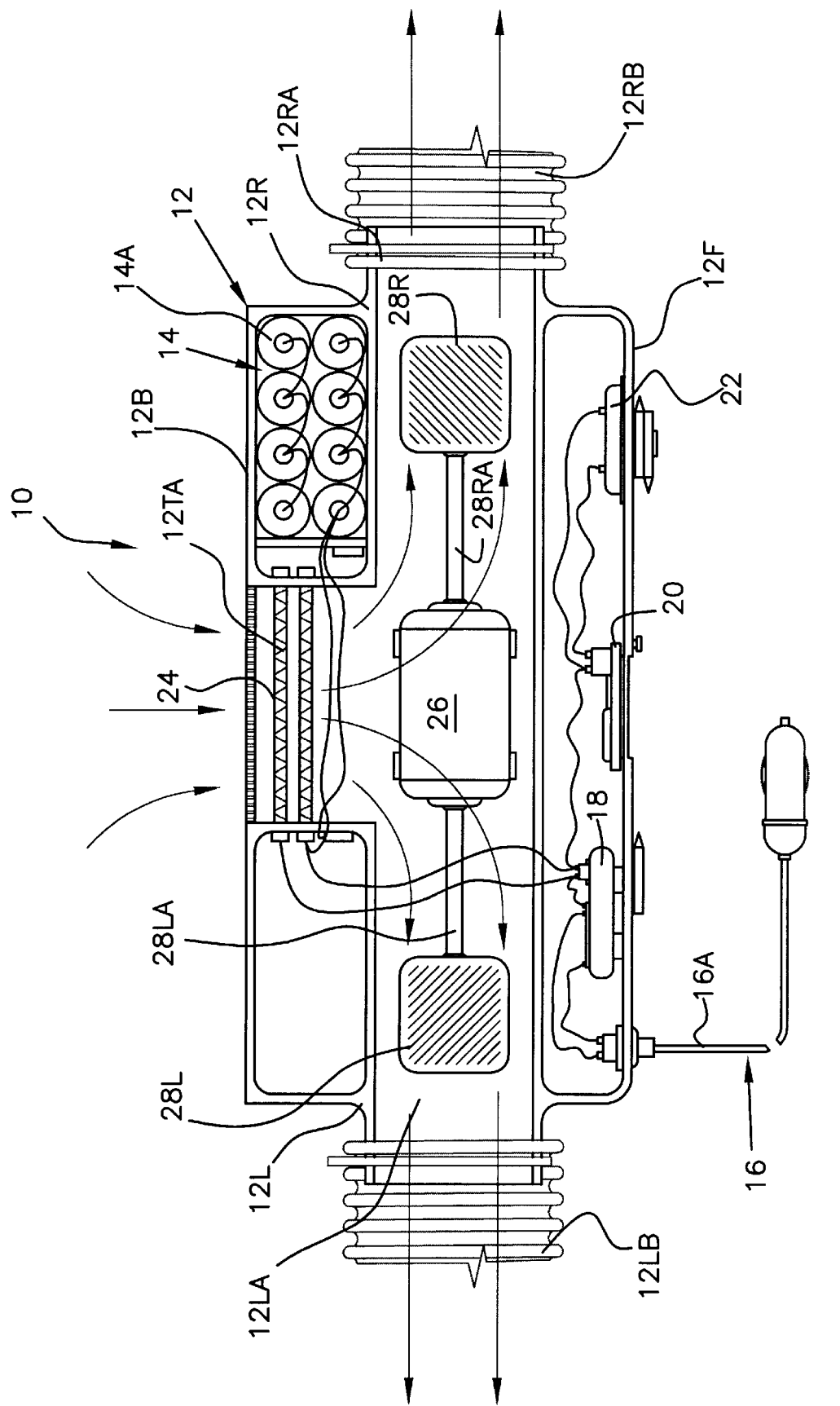
FIG. 3 is a cross sectional view of a portable automatic windshield defroster,
in accordance with the present invention.

Lastly, referring to FIG. 3, there is shown a cross sectional view of a portable automatic windshield defroster. The portable automatic windshield defroster (10) comprises a housing (12). The housing (12) comprises a housing top (12T) and a housing bottom (12B). The housing bottom (12B) has a housing bottom inlet (12BA) therethrough. A housing left (12L), a housing right (12R) with, at least one of the housings (12L, 12R) further comprising a housing egress (12LA, 12RA) therethrough.

The housing left (12L) comprises A housing left egress (12LA) positioned within the housing left (12L). a proximal end of the housing left egress (12LA) is sealably connected to A housing left connector (12LB) which functions to cover the housing left egress (12LA). A housing left diffuser (12LC) is sealably connected to a distal end of the housing left connector (12LB).

The portable automatic windshield defroster (10) further comprises a housing right egress (12RA) positioned with the housing right (12R) having a proximal end of a housing right connector (12RB) sealably connected thereto covering the housing right egress (12RA). A housing right diffuser (12RC) is sealably connected to a distal end of the housing right connector (12RB).

A housing connector (12LB, 12RB) is securely sealably fastened at a proximal distal end to the at least one of the housings (12L, 12R) covering the housing egress (12LA, 12RA), and a housing diffuser (12LC, 12RC) is sealably fastened at a distal end of the housing connector (12LB, 12RB) covering the egress (12LA, 12RA).

The portable automatic windshield defroster (10) further comprises a primary power means (16).

The portable automatic windshield defroster (10) consists of an ON/OFF switch (18) which is electrically connected to the primary power means (16).

The portable automatic windshield defroster (10) further consists of a clock/timer (20) which is electrically connected to the ON/OFF switch (18). The clock/timer (20) functions to permit an user to pre-set a specific time and pre-determine a time period when the portable automatic windshield defroster (10) is activated.

The portable automatic windshield defroster (10) has a temperature control (22) which is electrically spliced between the heating element (24) and the clock/timer (20). The temperature control (22) functions to maintain a pre-determined temperature by monitoring and restricting an amount of electricity to the heating element (24), when the motor (26) is activated.

The portable automatic windshield defroster (10) still further comprises a motor (26) having a right fan shaft (28RA) which is attached to at least one right fan (28R). The at least one right fan (28R) comprises a right fan shaft (28RA) connected thereto. The motor (26) comprises a left fan shaft (28LA) which is attached to a left fan (28L).

The at least one right fan (28R) is rotated about the right fan shaft (28RA) drawing air in through the housing bottom inlet (12BA) and over the at least one heating element (24) and out through the at least one housing egress (12LA, 12RA) through the housing connector (12LB, 12RB) connected thereto to blow heated air from the housing diffuser (12LC,12RC) onto a vehicle windshield (30B).

The portable automatic windshield defroster (10) further comprises an auxiliary power supply (14). The auxiliary power supply (14) comprises at least one auxiliary power supply battery (14A) electrically connected to the ON/OFF switch (18).

The portable automatic windshield defroster (10) further comprises a primary power means (16). The primary power means (16) comprises a primary power means cigarette lighter cord (16A) removably attachable to a vehicle cigarette lighter (30C).

The housing bottom (12B) comprises a housing bottom attachment means (12BB) attached thereto and functioning to removably affix the housing bottom (12B) to a vehicle dashboard (30A).

The housing (12) is manufactured from a material selected from a group consisting of metal, metal alloy, plastic, plastic composite, wood, ceramic, fiberglass, epoxy, carbon-graphite, rubber, and rubber composites.

While the invention has been illustrated and described as embodied in a portable automatic windshield defroster, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A portable automatic windshield defroster mountable within a vehicle, said windshield defroster comprising:

a.) a housing having a top, a bottom, a bottom inlet therethrough, a pair of sidewalls where at least one of the sidewalls includes an egress therethrough, a connector securely and sealably fastened at a proximal distal end to the at least one side wall covering the egress and a diffuser sealably fastened at a distal end of said connector in communication with said egress;

b.) a source of power for said defroster;

c.) a motor having right and left fans connected thereto by complementary shafts and connected to said source of power;

d.) an ON/OFF switch electrically connected to said power means;

e.) a clock/timer electrically connected to said ON/OFF switch, where said clock/timer functions to permit a user to pre-set a specific time and predetermine a time period when the portable automatic windshield defroster is activated; and f) a temperature control and heating element, where said temperature control is electrically spliced between a said heating element and said clock/timer, the temperature control functioning to maintain a predetermined temperature by monitoring and restricting an amount of electricity to said heating element when said motor is activated, where said pair of fans are rotated about their respective said shafts to thereby draw air in through said inlet and over said heating element and out through said egress through said connector connected thereto, whereby to blow heated air from said diffuser onto a vehicle windshield.

2. The portable automatic windshield defroster according to claim 1, wherein said bottom includes an attachment means functioning to removably affix said bottom to a vehicle dashboard.

* * * * *